United States Patent
Adayilamuriyil et al.

(10) Patent No.: US 9,811,580 B2
(45) Date of Patent: Nov. 7, 2017

(54) POLICY BASED AUTOMATIC PHYSICAL SCHEMA MANAGEMENT

(71) Applicant: International Business Machines Corporation, Armonk, NY (US)

(72) Inventors: Lynette D. Adayilamuriyil, Olathe, KS (US); Marco Greco, Staines (GB); John F. Miller, III, Lake Oswego, OR (US); Raghupathi K. Murthy, Union City, CA (US); Sitaram Vemulapalli, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 14/051,260

(22) Filed: Oct. 10, 2013

(65) Prior Publication Data
US 2015/0106407 A1 Apr. 16, 2015

(51) Int. Cl.
G06F 17/30 (2006.01)

(52) U.S. Cl.
CPC .. G06F 17/30595 (2013.01); G06F 17/30292 (2013.01); G06F 17/30339 (2013.01)

(58) Field of Classification Search
CPC ......... G06F 17/30595; G06F 17/30339; G06F 17/30292
See application file for complete search history.

(56) References Cited

U.S. PATENT DOCUMENTS

| | | | |
|---|---|---|---|
| 7,474,657 B2 | 1/2009 | Sahni et al. | |
| 7,895,147 B2 | 2/2011 | Huang et al. | |
| 2006/0206507 A1 | 9/2006 | Dabhour | |
| 2007/0198591 A1* | 8/2007 | Teng | G06F 17/30339 |
| 2007/0294308 A1 | 12/2007 | Megerian | |
| 2010/0064357 A1* | 3/2010 | Baird | G06F 8/30 726/6 |
| 2010/0115246 A1 | 5/2010 | Seshadri | |
| 2012/0158722 A1 | 6/2012 | Gao et al. | |
| 2012/0191639 A1* | 7/2012 | Katahira | G06N 99/005 706/50 |
| 2013/0006950 A1 | 1/2013 | Adayilamuriyil et al. | |

(Continued)

FOREIGN PATENT DOCUMENTS

EP 2164002 3/2010

OTHER PUBLICATIONS

Donovan, W.J., "Data Fragmentation for Load and Query Performance", The Power Conference for Informix Professionals, Apr. 28, 2009, 48 pp.

(Continued)

*Primary Examiner* — Kristopher Andersen
(74) *Attorney, Agent, or Firm* — Janaki K. Davda; Konrad, Raynes, Davda and Victor LLP

(57) ABSTRACT

Provided are techniques for cyclic based data partitioning policy with automatic physical schema management. A data partitioning policy for data is received, wherein the data partitioning policy identifies a condition for automatically implementing the data partitioning policy and criteria for modifying a set of partitions. In response to the condition occurring, the data partitioning policy is automatically applied to select at least one partition from the set of partitions based on the criteria. An operation is performed on the at least one partition to modify the set of partitions.

14 Claims, 15 Drawing Sheets

(56) References Cited

U.S. PATENT DOCUMENTS

2013/0018849 A1    1/2013    Johnston et al.
2013/0117272 A1    5/2013    Barga et al.

OTHER PUBLICATIONS

IP.com, "Method for Detaching a Partitioning Online From a Range Partitioned Table", Disclosed Anonymously, IP.com No. IPCOM000210476D, Sep. 6, 2011, 6 pp.

Gomes, V., "Practices and Features for Performance on Bi Query Workloads—Informix 11.70", IBM Corporation, Information Management, 2012, 38 pp.

Mell, P., et al., "Effectively and Securely Using the Cloud Computing Paradigm", NIST, Information Technology Laboratory, Oct. 7, 2009, 80 pp.

Mell, P., et al., "The NIST Definition of Cloud Computing (Draft)", Recommendations of the National Institute of Standards and Technology, Special Publication 800-145 (Draft), Jan. 2011, 7 pp.

Office Action 1, Sep. 11, 2015, for U.S. Appl. No. 14/304,698, filed Jun. 13, 2014 by L.D. Adayilamuriyil et al., Total 22 pp.

Response to Office Action 1, Dec. 9, 2015, for U.S. Appl. No. 14/304,698, filed Jun. 13, 2014 by L.D. Adayilamuriyil et al., Total 9 pp.

Preliminary Amendment, Jun. 13, 2014, for U.S. Appl. No. 14/304,698, filed Jun. 13, 2014 by L.D. Adayilamuriyil et al., Total 5 pp.

U.S. Appl. No. 14/304,698, filed Jun. 13, 2014, entitled "Policy Based Automatic Physical Schema Management", invented by L.D. Adayilamuriyil et al., Total 58 pp.

Final Office Action, Mar. 15, 2016, for U.S. Appl. No. 14/304,698, filed Jun. 13, 2014 by A.D. Adayilamuriyil et al., Total 16 pp.

Response to Final Office Action, Jun. 10, 2016, for U.S. Appl. No. 14/304,698, filed Jun. 13, 2014 by A.D. Adayilamuriyil et al., Total 8 pp.

Office Action 3, Jul. 1, 2016, for U.S. Appl. No. 14/304,698, filed Jun. 13, 2014 by L.D. Asayilamuriyil et al., Total 16 pp.

Response to Office Action 3, Sep. 30, 2016, for U.S. Appl. No. 14/304,698, filed Jun. 13, 2014 by L.D. Asayilamuriyil et al., Total 9 pp.

Final Office Action 2, Jan. 13, 2017, for U.S. Appl. No. 14/304,698, filed Jun. 13, 2014 by L.D. Adayilamuriyil et al., Total 19 pp.

Response to Final Office Action 2, Apr. 6, 2017, for U.S. Appl. No. 14/304,698, filed Jun. 13, 2014 by L.D. Adayilamuriyil et al., Total 10 pp.

Notice of Allowance, dated Jun. 16, 2017, for U.S. Appl. No. 14/304,698, filed Jun. 13, 2014 by L.D. Adayilamuriyil et al., Total 15 pp.

312 Amendment, dated Jul. 27, 2017, for U.S. Appl. No. 14/304,698, filed Jun. 13, 2014 by L.D. Adayilamuriyil et al., Total 5 pp.

* cited by examiner

CREATE TABLE syntax diagram:

```
                .-STANDARD-.
>>-CREATE-+----+-+--------+-+--TABLE-+-------------------+--table---->
          '--> '-RAW-'               '-IF NOT EXISTS-'

>--+-| Table Definition |-----------------------+----+------+----------->
   |              (1)                 (2) | | (1)
   '------| OF TYPE Clause |--------'   '------| WITH Options |-'

>--+-------------------------+----+-----------------------+------------->
   |              (3) | | (1)
   (4) '-| SECURITY Clause |-'     '------| Storage Options |-'

>--+-------------------+----+--------------------------+--------------->
   |         (5) |  |
   '-| LOCK Mode |-'   '-| USING Access-Method |-'

>--+----------------------+------><
   |              (7) |
   (1)
   '------| Statistics Options |-'
```

PARTITION BY clause for tables

```
|--+-----------------------+--+-PARTITION-+--BY----------------------------
                              '-PARTITION '
   '-WITH ROWIDS-'
|--->

>--+--ROUND ROBIN--+--IN----dbspace-+-------------------------------------+
                   |     .-,-------.                                      |
                   |     V         |                                      |
                   +--IN----dbspace-+                                     |
                   |                                                      |
                   '---PARTITION--partition--IN--dbspace-+-'
                                                         (1)
   +-EXPRESSION---| Expression Partition Clause |---------------------
   |
   (2)
   +-RANGE--(--partition_key--)--| Interval Partition Clause |----
   |
   |
   '-LIST--(--partition_key--)--| List Partition Clause |----
                                                         (3)
```

FIG. 6

Interval Partition clause

```
|--INTERVAL--(--+-----------------+--)--+------------------+--|
                '-intvl_valexpr-'       '-| Rolling Window
                                             clause |-'

>--+-----------------------------------+--|
   |           .-,-------------.       |
   |           V               |       |
   '-+-------+-IN--(--+-dbspace-+--)-'
     '-STORE-'        '-dbspace_fun--( )-'

.-,-.
      V   |
>----PARTITION--partition--+-VALUES < range_expr-+--IN--
     dbspace-+--|          | (1)                 |
                           '------VALUES IS NULL-'
```

FIG. 7

| Element | Description | Restrictions | Syntax |
|---|---|---|---|
| *dbspace* | Name of a dbspace to store a partition | 2,048 *dbspaces* may be defined. All *dbspaces* that store the partitions have the same page size. | <u>Identifier</u> |
| *dbspace_fun* | Name of a User-Defined Function (UDF) that returns the name of a dbspace | The user-defined function and the returned dbspace should exist when storage is allocated for a new partition. | <u>CREATE FUNCTION statement</u> |
| *intvl_valexpr* | Interval value expression that defines an interval size in the partition key range | A constant literal expression that evaluates to a numeric or INTERVAL value compatible with the data type of the partition key expression. | <u>Identifier</u> |
| *max_size* | Upper limit on total storage size of the table | A value greater than zero. | Literal integer |
| *partition* | Name that is declared for a range partition | Name is unique among the names of partitions of the same table. If a table and associated index use the same interval partitioning strategy, each index partition has the same name as the corresponding table partition. | <u>Identifier</u> |
| *quantity* | Maximum number of rolling interval partitions | A value that is an integer greater than zero. User-defined range partitions are not included in this limit. | Literal integer |
| *range_expr* | Constant expression that defines the upper bound for partition key values stored in the partition | A constant literal expression that evaluates to a numeric, DATETIME or DATE data type compatible with the data type of the partition key expression. | <u>Constant Expressions</u> |
| *units* | Abbreviated unit of total mass storage for the table | Begins with K, KB, KiB, M, MB, MiB, G, GB, GiB, T, TB, TiB (or the lowercase forms of these letters). Any trailing characters may cause a syntax error. | Unquoted character string, beginning with the letter K, M, G, or T |

FIG. 9

MODIFY INTERVAL Clause

```
|--MODIFY--------INTERVAL--+--+------------------------------------------+--+----------------------------+
                           |  +-ENABLED---+                             .-,-------------.                |
                           |  '-DISABLED-'                              V               |                |
                           |                  '----+-----+--IN--(--+-+--dbspace-+-+--)-'                 |
                           |                       '-STORE-'          '-dbspace_fun--( )-'               |
                           +--+-ENABLED--+----------------------------------------------------------------+
                              |  '-DISABLED-'                                                             |
                              '-| Rolling Window clause |-'
```

Rolling Window clause

```
|--+-ROLLING--(--quantity--PARTITIONS--)--+--+----------------------------------+--+--| Action clause |--+--|
   |                                      |  '-LIMIT TO--max_size--units-'      |
   |   '-LIMIT TO--max_size--units---------'                                    |
   '-DROP ALL ROLLING-----------------------------------------------------------'
```

Action clause

```
                   .-INTERVAL FIRST----.
|-----+-DETACH--+--+-+---------------+-+--|
      '-DISCARD-'  | '-ANY-'         |
                   '-INTERVAL ONLY-'
```

FIG. 11

POLICY BASED AUTOMATIC PHYSICAL SCHEMA MANAGEMENT

FIELD

Embodiments of the invention relate to policy based automatic physical schema management.

BACKGROUND

A Relational DataBase Management System (RDBMS) uses relational techniques for storing and retrieving data in a relational database. Relational databases are computerized information storage and retrieval systems. Relational databases are organized into tables that consist of rows and columns of data. The rows may be called tuples or records or rows.

A table in a database may be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table.

The RDBMS may accept queries, such as Structured Query Language (SQL) queries and non-SQL queries (e.g., JavaScript® Object Notation (JSON) queries). JavaScript is a registered trademark of Oracle Corporation in the United States and/or other countries. A query may be described as a request for information from a database based on specific conditions. A query typically includes one or more predicates. A predicate may be described as an element of a search condition that expresses or implies a comparison operation (e.g., A=3).

When customers create a simple table (without partitioning), they specify a tablespace (e.g., a dbspace) or use a default tablespace. Partitioning may be described as dividing the table into multiple partitions, so that different portions of the table are stored in different partitions. Customers typically do not worry about underlying storage allocation decisions on chunks, extents, and pages that store the table.

In the real world, for time cyclic data management and better performance, customers may create partitioned tables. Time cyclic data management may be described as a system in which there is data for different time periods. If customers choose to partition the table based on a range of values (i.e., range partitioning), there are many decisions to be made, such as, the periodic downtime required to adjust the range (partition expression) definition, the physical schema definition, and creating CRON jobs to execute commands to implement a table policy. A CRON utility may be described as a time-based job scheduler in UNIX® or LINUXO® operating systems. UNIX is a registered trademark of The Open Group in the United States and/or other countries. LINUX is a registered trademark of Linus Torvalds in the United States and/or other countries.

For time cyclic data management, data for each time period (hour, day, week, month, quarter, year, etc.) may be kept in distinct partitions to improve the manageability of data. The data is rolled in (e.g., to a new partition) and rolled out (e.g., from an existing partition) in regular intervals. Corresponding effects on indices are typically managed implicitly by the database system. How the rolled out data is managed has to be decided (e.g., decide on whether to keep the data around, archive the data or remove the data). In some cases, the data is not being rolled out, but the data is being moved from one partition to other (probably slower/cheaper) media. During this process, the data may be compressed. In some cases (e.g., the data has been archived or is no longer needed), the partition may be truncated and the space for that partition may be re-used. Also, there are other operations, such as updating the statistics to reflect the remaining data (e.g., if the partition was rolled out or truncated). Rolled out refers to detaching a partition (and therefore data in that partition) from a table. Truncate refers to leaving the partition in the table, while removing the data by freeing up the space allocated for that data.

Customers may write a series of SQL scripts for operations, such as attaching a partition and detaching a partition, schedule downtime, and run the scripts at regular intervals manually or using CRON jobs.

One of the common operations on the table is to detach (either detach+archive or detach+purge) the oldest partition when rolling into a new time period.

The following is an example SQL Statement (A) for partition by expression:

```
CREATE TABLE orders
(
  order_num           serial(1001),
  order_date          date,
  customer_num            integer not null,
  ship_instruct       char(40),
  backlog             char(1),
  po_num              char(10),
  ship_date           date,
  ship_weight            decimal(8,2),
  ship_charge         money(6),
  paid_date           date    ) partition by expression
partition prv_partition (order_date < date('01-01-2010')) in
mydbs,
partition jan_partition (order_date >= date('01-01-2010') and
order_date < date('02-01-2010') in mydbs,
partition feb_partition (order_date >= date('02-01-2010') and
order_date < date('03-01-2010') in mydbs,
partition mar_partition (order_date >= date('03-01-2010') and
order_date < date('04-01-2010') in mydbs,
partition apr_partition (order_date >= date('04-01-2010') and
order_date < date('05-01-2010') in mydbs,
```

The following is an example SQL Statement (B) for partition by interval:

```
CREATE TABLE orders
(
  order_num           serial(1001),
  order_date          date,
  customer_num            integer not null,
  ship_instruct       char(40),
  backlog             char(1),
  po_num              char(10),
  ship_date           date,
  ship_weight            decimal(8,2),
  ship_charge         money(6),
  paid_date           date    )
partition by range(order_date) interval((NUMTOYMINTERVAL(1,
'MONTH')) store in (mydbs, mydbs2)
partition prv_partition values < date('01-01-2010') in mydbs;
```

The following is an example script with a DETACH PARTITION clause:

```
ALTER PARTITION ON TABLE "sales".orders
    DETACH PARTITION jan_partition jan_2010_orders;
```

OFFLINE refers to an operation taking an exclusive lock on the table, and no other user may use that locked table. ONLINE refers to having concurrent users access a table.

The following is an example script with an ONLINE operation with an INTERVAL strategy:

```
ALTER PARTITION ONLINE ON TABLE "sales".orders
    DETACH PARTITION jan_partition jan_2010_orders;
```

Continuing with the example, script, the data that has been detached is handled by compressing the data or dropping the table. A detached partition is created as a separate table having a table name same that is the same as the partition name (e.g., jan_2010_orders).

```
-- Compress the data
execute procedure task("compress repack shrink", "salesdb", "sales",
"jan_2010_orders");
-- or Drop the table
drop table "sales".jan_2010_orders;
```

Some operations, such as dropping a partition, may require an exclusive lock and access to the table from which a partition is being detached. During the exclusive lock, queries on that locked table have to wait or may time out.

SUMMARY

Provided is a method for cyclic based data partitioning policy with automatic physical schema management. A data partitioning policy for data is received, wherein the data partitioning policy identifies a condition for automatically implementing the data partitioning policy and criteria for modifying a set of partitions. In response to the condition occurring, the data partitioning policy is automatically applied to select at least one partition from the set of partitions based on the criteria. An operation is performed on the at least one partition to modify the set of partitions.

Provided is a computer program product for cyclic based data partitioning policy with automatic physical schema management. The computer program product comprises a computer readable storage medium having program code embodied therewith, the program code executable by at least one processor to perform: receiving a data partitioning policy for data, wherein the data partitioning policy identifies a condition for automatically implementing the data partitioning policy and criteria for modifying a set of partitions; in response to the condition occurring, automatically applying the data partitioning policy to select at least one partition from the set of partitions based on the criteria; and performing an operation on the at least one partition to modify the set of partitions.

Provided is a computer system for cyclic based data partitioning policy with automatic physical schema management. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: receiving a data partitioning policy for data, wherein the data partitioning policy identifies a condition for automatically implementing the data partitioning policy and criteria for modifying a set of partitions; in response to the condition occurring, automatically applying the data partitioning policy to select at least one partition from the set of partitions based on the criteria; and performing an operation on the at least one partition to modify the set of partitions.

BRIEF DESCRIPTION OF THE SEVERAL VIEWS OF THE DRAWINGS

Referring now to the drawings in which like reference numbers represent corresponding parts throughout:

FIG. 2 illustrates a CREATE TABLE syntax diagram in accordance with certain embodiments.

FIG. 6 illustrates a PARTITION BY clause syntax diagram in accordance with certain embodiments.

FIG. 7 illustrates an INTERVAL PARTITION clause syntax diagram in accordance with certain embodiments.

FIG. 9 illustrates a table with information for each element in the INTERVAL PARTITION clause in accordance with certain embodiments.

FIG. 11 illustrates an ALTER PARTITION MODIFY INTERVAL syntax diagram in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
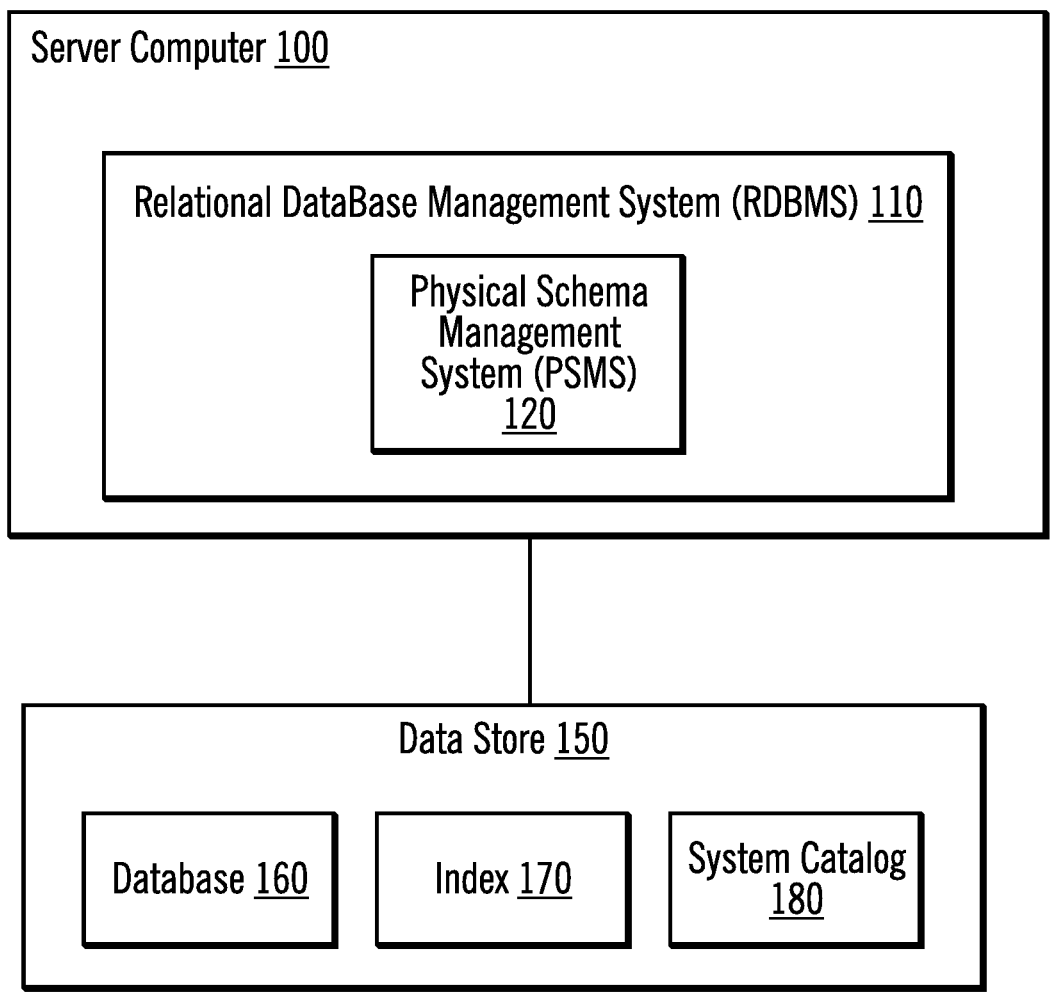
FIG. 1 illustrates a computing environment in accordance with certain embodiments.

FIG. 1 illustrates a computing environment in accordance with certain embodiments. A server computer 100 includes an RDBMS 110. In certain embodiments, the server computer 100 is a database server. The RDBMS 110 includes a Physical Schema Management System (PSMS) 120. The server computer 100 is coupled to a data store 150. The data store 150 includes a database 160, an index 170, and a system catalog 180.

The PSMS 120 ties multiple features to create a policy based, automatic physical schema management system. The PSMS 120 combines the following:

1. An ability to create new partitions (also called fragments) automatically for tables using an INTERVAL partition strategy. In certain embodiments, fragment is a synonym for partition.

2. An ability to detach partitions online for interval or expression(range) strategy. Range partitioning may be described as specifying a "range of qualifying values" within a row to be stored in a partition, which is referred to as a range partition). Interval partitioning may be described as a specific type of range partitioning with a continuous range, such as calendar time/week/month/etc., having increasing numerical values, and such partitions may be referred to as interval partitions.

3. An ability to attach partitions online for interval or expression(range) strategy.

4. An in-built database job scheduler (e.g., DBSCHEDULER) to recognize the policy requirements and execute the policy requirements.

5. An ability to automatically detect the need for statistics re-collection after attach operations and detach operations and collect those statistics in the background without intervention.

The following is an example Statement (1):

```
CREATE TABLE "sales".orders( )
   (
   order_num        serial(1001),
   order_date       date,
   customer_num     integer not null,
   ship_instruct    char(40),
   backlog          char(1),
   po_num           char(10),
   ship_date        date,
   ship_weight      decimal(8,2),
   ship_charge      money(6),
   paid_date        date   )
PARTITION BY RANGE (order_date)
INTERVAL 7 UNITS DAY
ROLLING 54 PARTITIONS
LIMIT TO 20 GB
DETACH
STORE IN (dbspord1, dbspord2, dbspord3);
```

In Statement (1), for the INTERVAL strategy, the PSMS 120 now allows adding the following new clauses (extensions or options) to implement the policies: INTERVAL PARTITION, ROLLING PARTITIONS, LIMIT TO, DETACH/DISCARD, and STORE IN.

The INTERVAL clause enables the ability to specify a starting point from which new partitions are automatically added as the data from new ranges come in and enables the ability to attach and detach a partition ONLINE (i.e., while at least one other user is accessing the table to which the partition is being attached or from which the partition is being detached).

The ROLLING PARTITIONS clause specifies how many partitions to keep in the table. As the table grows in size and number of partitions, the PSMS 120 enforces this clause by detaching/purging the partitions according to rules specified in the ROLLING PARTITIONS clause and the LIMIT TO clause.

The LIMIT TO clause specifies the maximum size of the table. When either the number of interval partitions exceeds the number set in the ROLLING PARTITIONS clause or the overall (data and indices) allocated table size exceeds the size set in the LIMIT TO clause, partitions are detached to stand-alone tables. In certain embodiments, these stand-alone tables have names that are automatically determined in a unique manner (e.g., a viable naming scheme may be "tabname[1,80]||_<start value of partition>||_||<end value of partition>", and this allows keeping track of purged partitions without the need of an ad hoc table).

In certain embodiments, The PSMS 120 identifies partitions that qualify for detachment as follows:

for the ROLLING PARTITIONS clause, interval partitions are considered and are detached in order of lowest partitioning value. Each partition may hold a specific set of values for the column used for partitioning (e.g., for a table partitioned on an integer column, the first partition may hold values from 10001 to 20000, the second partition may hold values from 20001 to 30000, etc. These partitions may exist at creation time or may be added automatically. In certain embodiments, the lowest partitioning value refers to the partition holding the lowest set of values, in this case 10001 to 20000 (unless 1 to 10000 had been created automatically later on, in which case it would be 1 to 10000).

for the LIMIT TO clause,
   if the ANY clause had been specified, any partition, range or interval is detached, starting with the one having the lowest partitioning value.
   If the INTERVAL ONLY clause has been specified, only interval partitions are detached, starting with the one having the lowest value.
   If the INTERVAL FIRST clause has been specified or no INTERVAL clause has been specified, the PSMS 120 detaches interval partitions first starting from the lowest, until the size requirements have been met. If, after having detached all interval partitions, the size limit has not been met, the PSMS 120, as a safety measure, detaches RANGE partitions starting from the lowest. In certain embodiments, the INTERVAL FIRST clause is the default.
   When RANGE PARTITIONS are being detached or discarded, they are replaced with empty partitions, so that the schema of the table is preserved.

The following is an example of a DETACH|DISCARD clause format:
   DETACH|DISCARD[[ANY|INTERVAL FIRST|INTERVAL ONLY]]

The DISCARD keyword indicates that detached partitions are to be dropped, and the DETACH keyword indicates that detached partitions are to be preserved. Applications may detect detached partitions and archive their contents into different tables, archive their contents into different databases, aggregate the contents, etc.

The following is an example of a STORE IN clause format:
   STORE IN (<dbspace list>|<function_to_return_dbspacename( )>)

The STORE IN clause specifies where to store new partitions. These spaces may be specified explicitly or the PSMS 120 may invoke a function that returns the name of the space in which to store a new partition.

For ONLINE operations, the attach and detach operations are done ONLINE by enforcing the pre-requisites on the table (e.g. the indexes follow partition strategy of the table).

The PSMS 120 provides efficient update of statistics. In certain embodiments, the PSMS 120 collects statistics on data in each partition and combining them to form the whole statistics.

The following is an example Statement (2) for creating a table using the PARTITION BY RANGE . . . INTERVAL, clause, the ROLLING PARTITIONS clause, the LIMIT TO clause, the DETACH clause, and the STORE IN clause.

```
CREATE TABLE "sales".orders( )
(
    order_num        serial(1001),
    order_date       date,
    customer_num     integer not null,
    ship_instruct    char(40),
    backlog          char(1),
    po_num           char(10),
    ship_date        date,
    ship_weight      decimal(8,2),
    ship_charge      money(6),
    paid_date        date    )
PARTITION BY RANGE (order_date)
    INTERVAL 7 UNITS DAY
    ROLLING 54 PARTITIONS
    LIMIT TO 20 GB
    DETACH
    STORE IN (dbspord1, dbspord2, dbspord3);
```

FIG. 2 illustrates a CREATE TABLE syntax diagram 200 in accordance with certain embodiments. The CREATE TABLE syntax diagram 200 includes a TABLE DEFINITION clause, a WITH OPTIONS clause, and a STORAGE OPTIONS clause.

Figure 3:
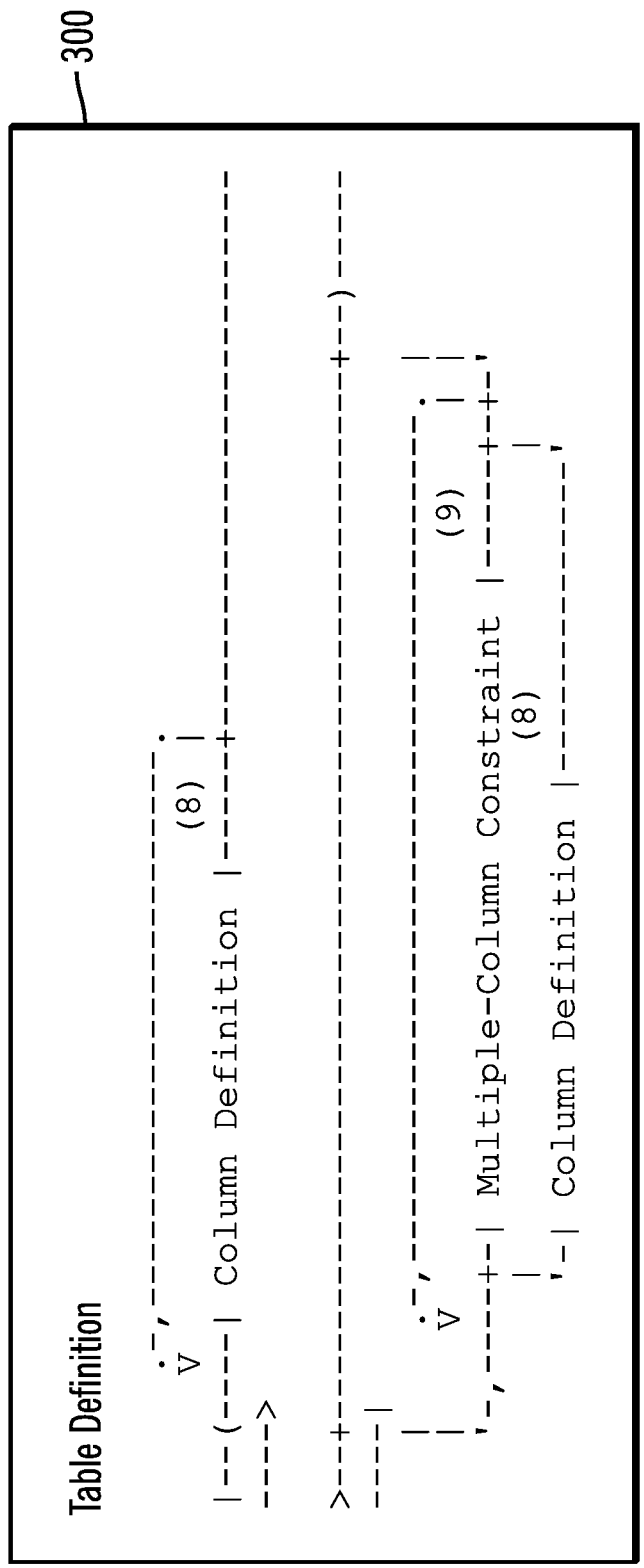
FIG. 3 illustrates a TABLE DEFINITION ALTER PARTITION MODIFY INTERVAL statement in accordance with certain embodiments.
Figure 4:
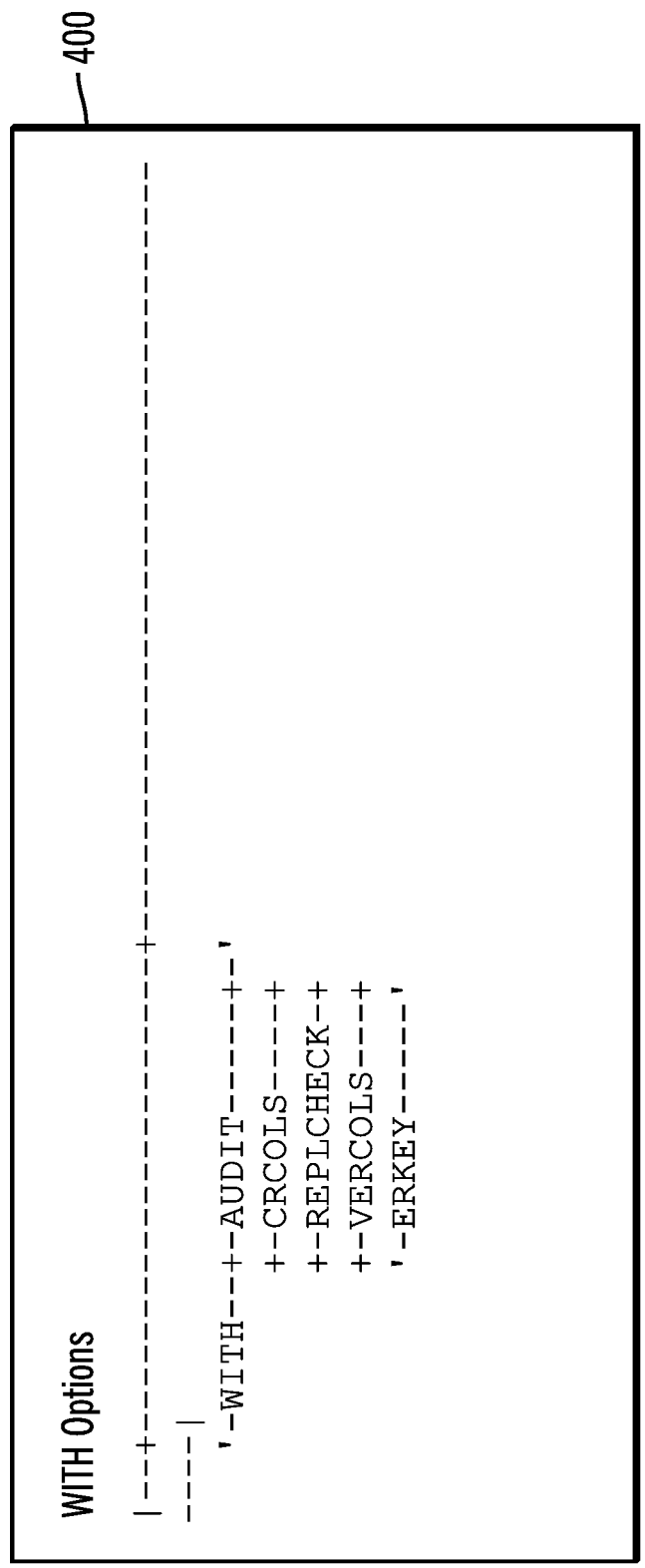
FIG. 4 illustrates a WITH OPTIONS clause syntax diagram in accordance with certain embodiments.
Figure 5:
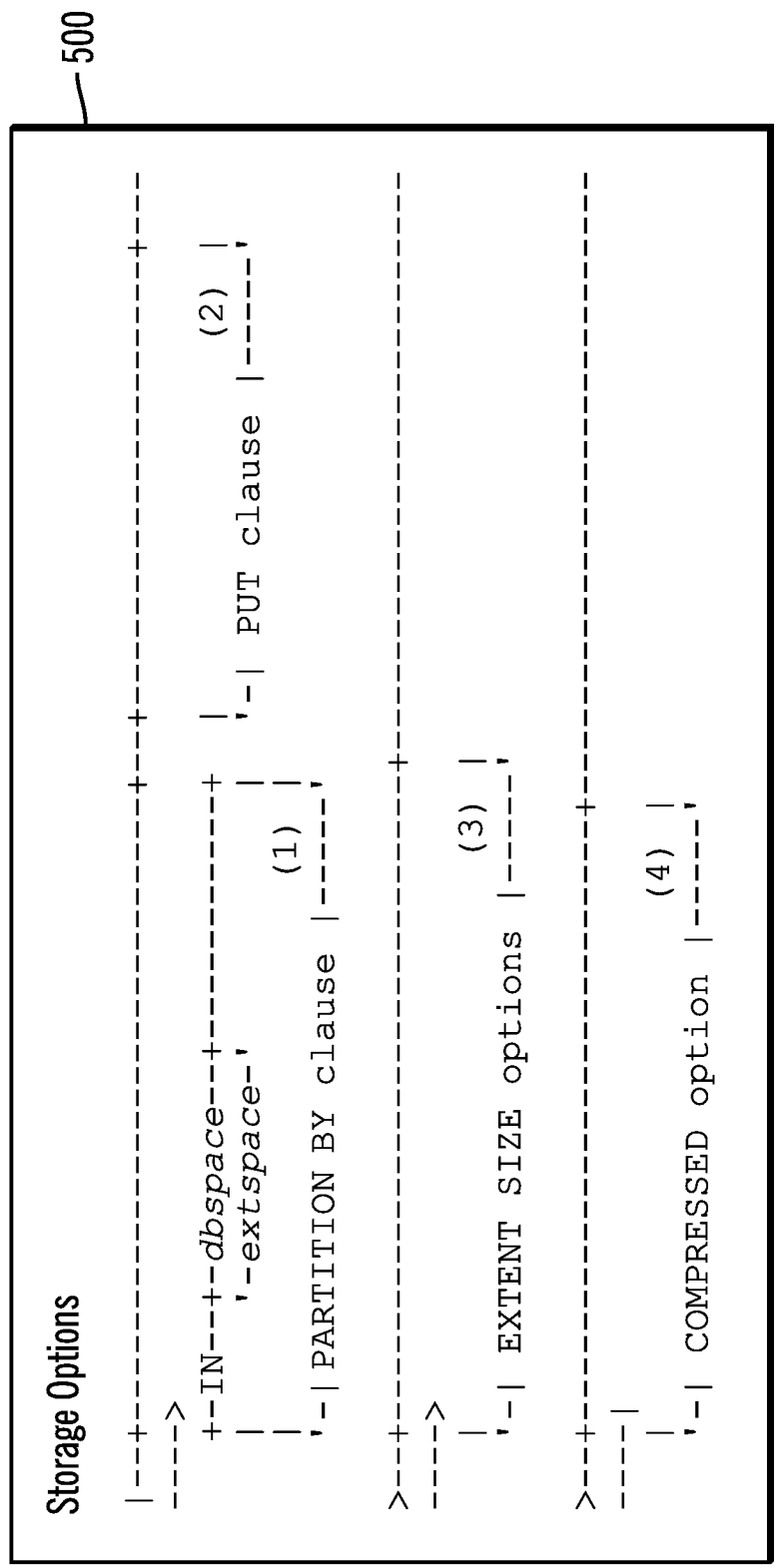
FIG. 5 illustrates a STORAGE OPTIONS clause syntax diagram in accordance with certain embodiments.

FIG. 3 illustrates a TABLE DEFINITION syntax diagram 300 in accordance with certain embodiments. FIG. 4 illustrates a WITH OPTIONS clause syntax diagram 400 in accordance with certain embodiments. FIG. 5 illustrates a STORAGE OPTIONS clause syntax diagram 500 in accordance with certain embodiments.

FIG. 6 illustrates a PARTITION BY clause syntax diagram 600 in accordance with certain embodiments. The PARTITION BY clause syntax diagram 600 includes an INTERVAL PARTITION clause.

Figure 8:
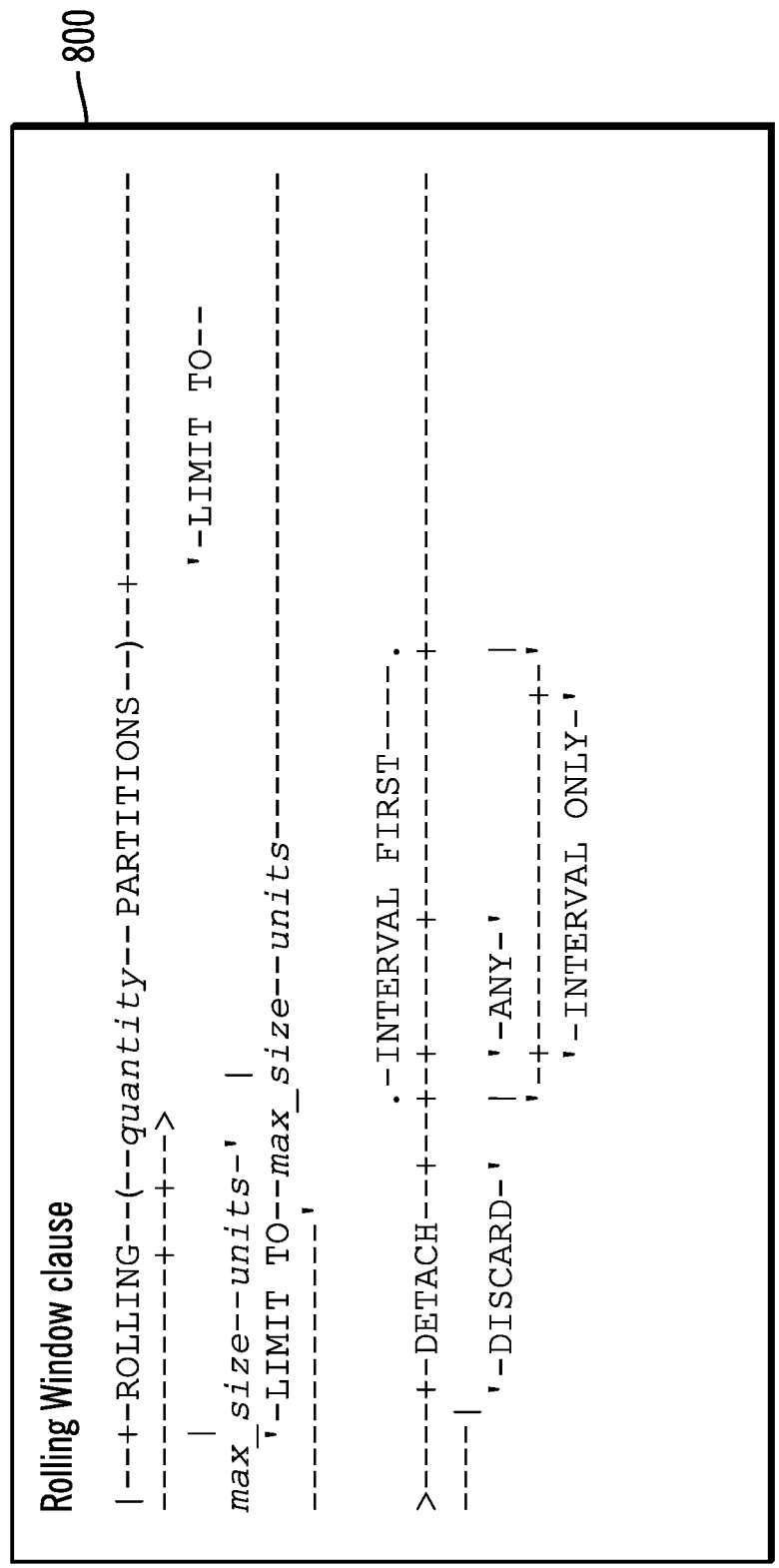
FIG. 8 illustrates a ROLLING WINDOW clause syntax diagram in accordance with certain embodiments.

FIG. 7 illustrates an INTERVAL PARTITION clause syntax diagram 700 in accordance with certain embodiments. The INTERVAL PARTITION clause syntax diagram 700 includes an INTERVAL clause, a ROLLING WINDOW clause, a STORE IN clause, and a PARTITION clause. FIG. 8 illustrates a ROLLING WINDOW clause syntax diagram 800 in accordance with certain embodiments. The ROLLING WINDOW clause includes a ROLLING PARTITIONS clause, a LIMIT TO clause, and DETACH/DISCARD clause.

The INTERVAL PARTITION clause is used to store rows in partitions defined by one or more range expressions, based on a numeric or INTERVAL partitioning key. The PSMS 120 may create new interval partitions automatically during Data Manipulation Language (DML) operations (e.g., Data Definition Language (DDL) statements) that insert new rows or update existing rows whose partitioning key values are outside the range of any existing partition. Within this category, DDL statements are for physical schema management (as opposed to logical schema portions, such as defining columns, types, references within a CREATE TABLE statement).

The INTERVAL PARTITION clause may be used to define a set of range partitions to store quantified data. For a range interval partitioning strategy, at least one partition for storing rows with non-NULL partition-key values is defined by the INTERVAL PARTITION clause syntax.

The ROLLING PARTITIONS and LIMIT TO clauses of the ROLLING WINDOW clause may define an upper limit on the total storage size of the table and on the number of interval partitions in the rolling window partitioning strategy. When either of these limits is exceeded, the excess interval partitions are automatically destroyed or detached by the PSMS 120. In certain embodiments, specifications define a purging policy for the table.

FIG. 9 illustrates a table 900 with information for each element in the INTERVAL PARTITION clause (and the ROLLING WINDOW clause included in the INTERVAL PARTITION clause) in accordance with certain embodiments.

The INTERVAL PARTITION clause defines non-overlapping intervals in the range of the partition key expression that are specified (within parentheses) immediately after the PARTITION BY RANGE keywords of the PARTITION BY clause. The PARTITION BY RANGE keywords are a synonym for the PARTITION BY RANGE keywords.

In certain embodiments, the INTERVAL PARTITION clause is not used to define a remainder partition.

The intvl_valexpr expression that follows (within parentheses) the INTERVAL keyword defines the size of an interval within the range of partition key values. The data type of the intvl_valexpr expression depends on the data type of the partition key column that followed the RANGE keyword:

If the partition key is a numeric data type, the intvl_valexpr expression evaluates to a numeric value. A numeric intvl_valexpr expression is a constant expression greater than zero, with no fractional part.

If the partition key is a DATE or DATETIME data type, the intvl_valexpr expression evaluates to an INTERVAL value. An INTERVAL intvl_valexpr expression is a constant expression greater than zero.

The minimum value of the intvl_valexpr expression depends on the data type of the partition key expression. In certain embodiments, the minimum value of the intvl_valexpr expression is a partition or fractional part of the interval expression. For example, the minimum may be as follows:

The minimum is a second if the partition key is a DATETIME column.

The minimum is a day if the partition key is DATE column.

The minimum is 1 if the partition key is a numeric column.

A literal number or a literal INTERVAL value may be used as the intvl_valexpr expression. The built-in NUMTODSINTERVAL, NUMTOYMINTERVAL, TO_DSINTERVAL, or TO_YMINTERVAL functions may be used to specify the intvl_valexpr expression. For the syntax of these functions, and examples of their use in the INTERVAL PARTITION clause, see TO_YMINTERVAL( ) function and TO_DSINTERVAL( ) function.

If no intvl_valexpr expression is specified, the automatic creation of interval partitions is disabled.

When the INTERVAL PARTITION clause is used to define interval partitioning for a table or index, it is not necessary to know what the full range of partition key values will be. When a row is inserted that does not fit in any range partition or interval partition, the PSMS 120 automatically creates a new interval partition to store the row, based on the interval intvl_valexp value, without human (e.g., Database Administrator (DBA)) intervention.

The system-generated name for interval partitions of a table or of an index is sys_pevalpos, where evalpos is the syspartitions.evalpos entry for the partition in the system catalog of the database 160. If a table and its index use the same range interval partitioning strategy, each system-generated index partition will have the same identifier as a system-generated partition of the table.

These automatically generated partitions correspond to parts of the partition key range that include the new data values. Gaps may separate automatically generated interval partitions, if between two successive partitions a portion of the range that is larger than intvl_valexp includes no rows. In certain embodiments, gaps are not allowed between the partitions that explicitly defined in the INTERVAL PARTITION clause.

If no intvl_valexp expression is specified, the range partitions that are explicitly defined in the INTERVAL PARTITION clause are available to store rows that have corresponding partition key values within their range intervals, as are any existing interval partitions that were generated before the automatic creation of interval partitions was disabled. When automatic creation of interval partitions is disabled, if a user attempts to insert a row whose partition key value does not fall in the range of any existing partition, an error may be used and the insertion fails.

The dbspace (or the comma-separated list of dbspace names) that follows STORE IN keywords identifies storage spaces for new interval partitions that the PSMS 120 automatically creates when DML operations store rows whose partition key values are outside the range of existing partitions. If multiple dbspaces are specified, the PSMS 120 creates interval partition in a round-robin fashion in the dbspaces specified in the STORE IN clause and declares system-generated names for the new partitions.

In certain embodiments, the dbspaces in the STORE IN clause need not be present when the table or index is created. The dbspaces may be added to server computer 100 after creating the table or index. In certain embodiments, the dbspaces referenced in the INTERVAL PARTITION clause have the same page size.

If the STORE IN clause is omitted and the table needs to store rows outside the existing interval and range partitions, the PSMS 120 automatically creates new interval partitions in a round-robin fashion in the dbspaces that the PARTITION specifications list for the range expression partitions.

Instead of a list of literal dbspace identifiers, the STORE IN clause may optionally specify a User-Defined Function (UDF) that returns the name of an existing dbspace. The identifier that is declared for this UDF may be arbitrary.

In certain embodiments, the UDF accepts four parameters:
 a table owner, of a CHAR(32) data type;
 a table name, of a CHAR(255) data type;
 a partitioning value of the same data type as the partitioning key or a compatible type that can be implicitly cast to that data type; and
 a retry flag, of an INT data type.

The following is an example of a UDF that returns a dbspace name from a function expression in the STORE IN clause:

```
CREATE FUNCTION mydbname
    (owner CHAR(32),
    table CHAR(255),
    value INT, -- Data type must match or must be compatible
        -- with the data type of the partitioning key
    retry INT) --
RETURNING CHAR(255)
IF (retry > 0) THEN
        RETURN NULL;           -- if it doesn't work the first time,
        -- do not try again --
END IF;
IF (value<0) THEN
        RETURN "dbs1";
ELSE
        RETURN "dbs2";
END IF;
END FUNCTION
```

The PSMS 120 calls the specified function when a new interval partition needs to be created for the table. If the attempted partition creation with the returned dbspace fails, the same function is called a second time with the retry flag set, so that a different dbspace name may be returned. In certain embodiments, upon a second failure, the DML statement that is being executed returns an error.

In certain embodiments, at least one range partition in the INTERVAL PARTITION clause is defined. In certain embodiments, each partition declaration has the following elements:

The PARTITION keyword, followed by a name that is declared for the partition. In certain embodiments, no other partition of the table has the same name.

The VALUES keyword, followed by a Boolean expression with one of the following formats: (1) the less than (<) relational operator and a range expression defining the upper bound for partition key values that can be stored in the partition or the IS NULL operator. If the partition key can take a NULL value, this is used to define the NULL partition that stores the rows with NULL as their partition key value. In certain embodiments, no more than one partition may be defined by the IS NULL operator. The NULL partition is not required, but if the NULL partition does not exist, the PSMS 120 may return an error if a user attempts to insert a row in which the partition key column is NULL.

The IN keyword, followed by the name of the dbspace that stores the partition. This may be a dbspace that the STORE IN specification also references or a dbspace that is not included in the STORE IN list.

If the range partitions are not defined in ascending order, the PSMS 120 sorts them in ascending order, so that the partition in the first ordinal position has the smallest upper bound.

In certain embodiments, two partitions in the same INTERVAL PARTITION clause may not have the same upper bound and none of the range partitions defined in the PARTITION specifications may overlap. If an (intvl_valexpr) size specification follows the INTERVAL keyword, the PSMS 120 issues an error if the difference between the range expressions that define consecutive range partitions is not the same value as the INTERVAL size specification.

The NULL partition is not required, but the PSMS 120 returns an error if a user attempts to insert a row in which the partition key value is NULL, but no NULL partition exists.

The following is an example Statement (3) that uses the value of the INT column cust_id as the numeric partition key and defines four range partitions. Interval partitions whose interval size is 1000000 will be created by the PSMS 120 for inserted rows with cust_id values that exceed 7999999:

```
CREATE TABLE customer (cust_id INT, name CHAR (128),
  street CHAR (1024),
  state CHAR (2), zipcode CHAR (5), phone CHAR (12))
  PARTITION BY RANGE (cust_id)
  INTERVAL (1000000) STORE IN (dbs2, dbs1)
    PARTITION p0 VALUES < 2000000 IN dbs1,
    PARTITION p1 VALUES < 4000000 IN dbs1,
    PARTITION p2 VALUES < 6000000 IN dbs2,
    PARTITION p3 VALUES < 8000000 IN dbs3;
```

The following is an example Statement (4) with a DATETIME index key, and, if values of the dt1 column exceed the limit of the range partition that the VALUES clause specifies, interval partitions are created in the dbs1 dbspace for rows with year values after 2005 in 25-year intervals:

```
CREATE TABLE t1 (c1 int, d1 date, dt1 DATETIME YEAR TO FRACTION)
  PARTITION BY RANGE (dt1) INTERVAL (INTERVAL(25)
  YEAR(2) TO YEAR)
    PARTITION p4 VALUES <
    DATETIME(2006-01-01 00:00:00.00000) YEAR TO FRACTION(5)
    IN dbs1;
```

In the following example Statement (5), the value of the DATE column order_date is the partition key, and four range partitions are defined, including p4 for rows that have NULL values for order_date. For an inserted row where the year value in order_date is later than 2007, interval partitions are created automatically in intervals of 1 month after Jan. 1, 2008, with successive partitions created in the dbs1, dbs2, and dbs3 dbspaces:

```
CREATE TABLE orders (order_id INT, cust_id INT,
        order_date DATE, order_desc CHAR (1024))
  PARTITION BY RANGE (order_date)
  INTERVAL (NUMTOYMINTERVAL (1,'MONTH')) STORE IN (dbs1,
  dbs2, dbs3)
    PARTITION p0 VALUES < DATE ('01/01/2005') IN dbs1,
    PARTITION p1 VALUES < DATE ('01/01/2006') IN dbs1,
    PARTITION p2 VALUES < DATE ('01/01/2007') IN dbs2,
    PARTITION p3 VALUES < DATE ('01/01/2008') IN dbs3,
    PARTITION p4 VALUES IS NULL in dbs3;
```

The following example Statement (6) of a DATE partition key is similar to the previous example Statement (5), but here the interval size is specified as 1.5 years. Interval partitions are created in intervals of 18 months (1.5 years) for order_date values after Dec. 31, 2009:

```
CREATE TABLE orders1 (order_id INT, cust_id INT, order_date
        DATE, order_desc CHAR (1024))
  PARTITION BY RANGE (order_date)
  INTERVAL (NUMTOYMINTERVAL (1.5,'YEAR')) STORE IN (dbs1,
  dbs2, dbs3)
    PARTITION p0 VALUES < DATE ('01/01/2004') IN dbs1,
    PARTITION p1 VALUES < DATE ('01/01/2006') IN dbs1,
    PARTITION p2 VALUES < DATE ('01/01/2008') IN dbs2,
    PARTITION p3 VALUES < DATE ('01/01/2010') IN dbs3;
```

In certain embodiments, for Statement (6), rows are not inserted into the orders1 table if the order_date value is missing, because no NULL partition is defined.

Tables with a RANGE INTERVAL partitioning strategy that also include the ROLLING WINDOW clause may be called rolling window tables. Interval partitions that the PSMS 120 creates for rolling window tables may be called rolling partitions. The ROLLING WINDOW clause may define a purge policy for the table. This purge policy limits how much data the table can store by defining criteria for automatically disposing of rolling interval partitions that reach a specified limit (in time or in allocated storage size) and for automatically replacing those partitions with new empty partitions in which to insert new data records.

The purge policy causes existing partitions to be detached or discarded when either the number of interval partitions exceeds the quantity specified in the ROLLING PARTITIONS clause or when the total storage allocated to the table (for data and for indexes) exceeds the size in the LIMIT TO clause.

After the purge policy limit is reached, which partitions qualify to be detached is determined by the keywords that defined the limit and by the keywords that defined the actions of the purge policy:

For a limit specified in the ROLLING PARTITIONS clause, interval partitions are considered. These will be detached in order of lowest partitioning value, as indicated by the syspartitions.evalpos value for the partition in the system catalog.

For a limit specified in the LIMIT TO clause, (1) If the ANY keyword immediately follows the DETACH or DISCARD keyword, a range or interval partition is detached, starting with the partition having the lowest syspartitions.evalpos value; (2) if the INTERVAL ONLY keywords are specified, interval partitions are detached, starting with the partition having the lowest syspartitions.evalpos value; and (3) if the INTERVAL FIRST clause is specified or no keyword immediately follows the DETACH or DISCARD keyword, the interval partitions are detached first, starting with the lowest syspartitions.evalpos value, until the size requirements have been met. If, after having detached the interval partitions, the size limit has not been met, the PSMS 120, as a safety measure, detaches range partitions, starting with the lowest. In any case, when range partitions are being detached or discarded, they are replaced with new empty partitions for storing the same ranges of values so that the schema of the table is preserved.

In certain embodiments, purge policies are designed to be enforced periodically (e.g., daily) as a scheduler task at a time when the required DETACH and ATTACH operations on partitions of the rolling window table are unlikely to conflict with access attempts by concurrent users.

Figure 10:
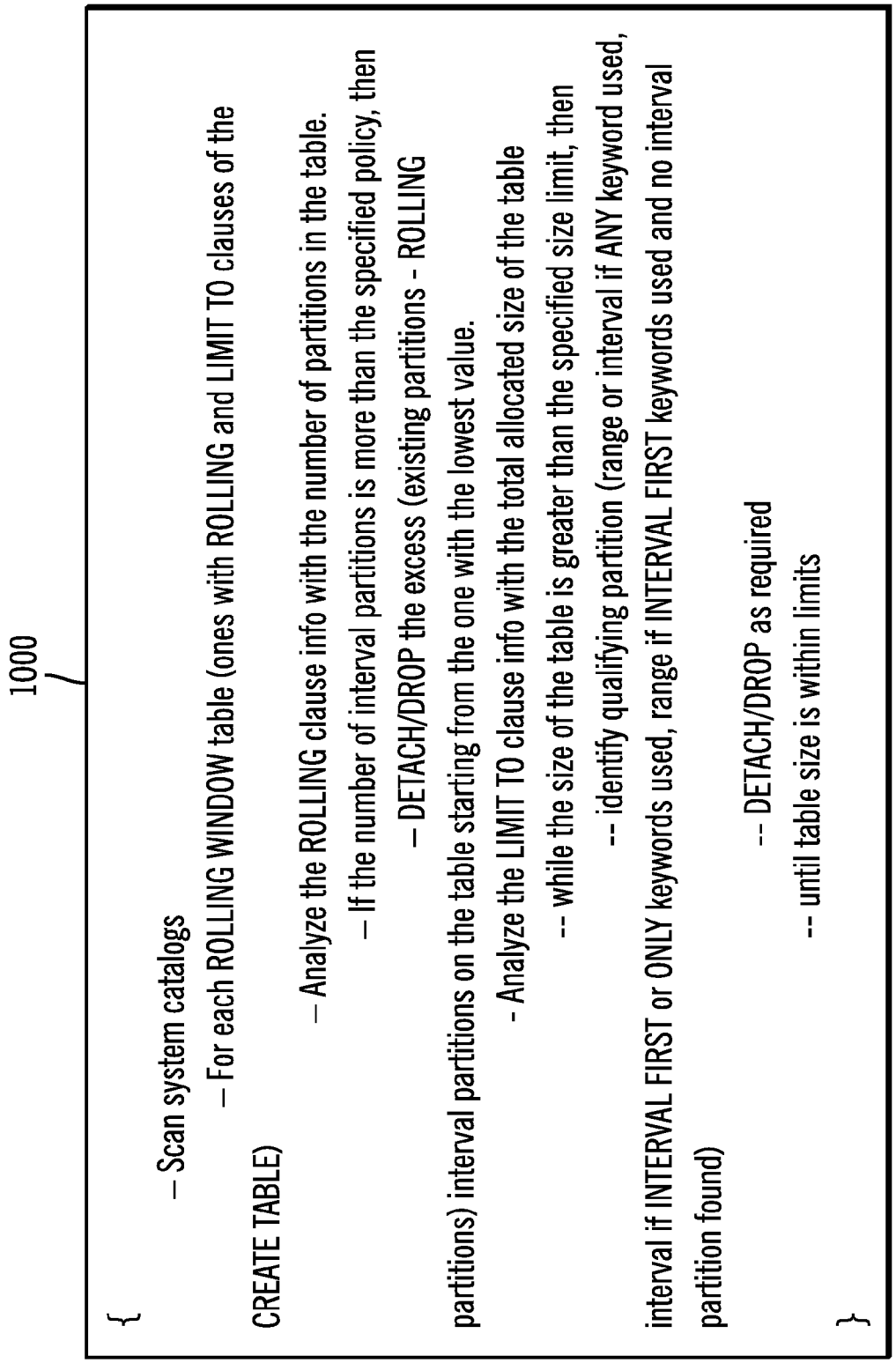
FIG. 10 illustrates sample pseudo code for a syspurge( ) task in accordance with certain embodiments.

In certain embodiments, purge policies also may be manually enforced by running a syspurge( ) system function. FIG. 10 illustrates sample pseudo code 1000 for the syspurge( ) task in accordance with certain embodiments.

After the syspurge( ) function is invoked, the PSMS 120 inspects the system catalog and identifies any rolling window tables whose purging policy has been exceeded. The PSMS 120 then either discards or detaches, as specified by the purge policy, qualifying rolling partitions until the purging policy is satisfied or until no more rolling partitions can be removed. The syspurge( ) function requires no arguments, but accepts an optional argument that enables online log diagnostics.

In certain embodiments, the ROLLING WINDOW clause provides two keyword options for processing the detached partitions:

The DETACH keyword to detach rolling partitions into independent tables that the PSMS 120 creates, whose table identifiers are of this form:

<original_table_name>_<lower value>_<higher value>.

Here, lower_value and higher_value are the minimum and maximum values of the interval range for that partition, before it was detached.

If a table of that name already exists, a counter is appended after the higher value:
<original_table_name>_<lower value>_<higher value>_1.

This continues with_2 appended to the next table name (or a larger integer appended, if appending_2 does not produce a unique table name).

The DISCARD keyword to destroy the detached partitions.

The DISCARD keyword specifies that successfully detached partitions be dropped, so that unneeded data is removed in a timely manner, and storage space for the table is constrained to the stipulated amount.

In certain embodiments, the syntax of the Rolling Window clause of the CREATE TABLE statement resembles, but is not identical to, the syntax of the Rolling Window clause of the ALTER PARTITION MODIFY INTERVAL statement. This ALTER PARTITION option may define rolling partitions on a table that uses ordinary range interval partitioning or may remove the purging policy on a rolling window table. This ALTER PARTITION statement can also change the ROLLING quantity PARTITIONS or LIMIT TO max_size specification or can replace the DETACH or DETACH keyword of an existing purge policy. Disabling interval partitioning for a table also suspends its purging policy, while re-enabling it resumes its purging policy.

FIG. 11 illustrates an ALTER PARTITION MODIFY INTERVAL syntax diagram 1100 in accordance with certain embodiments. An ALTER PARTITION . . . MODIFY DROP ALL ROLLING removes the rolling window policy. An ALTER PARTITION . . . MODIFY INTERVAL DISABLE disables rolling window policies without dropping them. An ALTER PARTITION . . . MODIFY INTERVAL ENABLE reinstates the current rolling window policy, if any is defined.

In certain embodiments, tables that use the ROLLING PARTITION or LIMIT TO keywords to define a rolling window partitioning strategy have the following restrictions:

The purging strategy that the ROLLING WINDOW clause defines for rolling partitions requires the PSMS 120 to perform ALTER PARTITION DETACH operations on partitions that satisfy the DETACH or DISCARD criteria. The ALTER PARTITION DETACH statement may be disallowed on tables with primary keys that are referenced by a foreign key constraint or on tables created with ROWIDs. For this reason, the CREATE TABLE and ALTER PARTITION MODIFY statements may not define or modify a table purging policy on tables that have primary key constraints or ROWID shadow columns.

Any indexes that the CREATE INDEX or ALTER PARTITION statement defines on a rolling window table must have the same storage distribution as the rolling window table.

Only users with access privileges may call routines that implement the DETACH or DISCARD options for detached rolling partitions. Users with RESOURCE access privileges may execute the syspurge( ) function for enforcing purging policies on tables that they own.

The PSMS 120 may ignore invocation of the syspurge( ) function on secondary servers in High Availability Data Replication (HDR) cluster environments.

In certain embodiments, the INTERVAL clause is implemented INLINE. INLINE indicates that new partitions are created automatically (e.g., as soon as they are needed, such as when a new value is being added to the table, and a partition to hold that value does not exist) to hold a specific set of values. The PSMS 120 adds new partitions as the data comes in that does not fit in the existing partitions. To implement other clauses, ROLLING and LIMIT, embodiments provide a new administrative thread called DBSCHDULER that runs any of the maintenance tasks. In certain embodiments ROLLING and LIMIT are implemented INLINE (e.g., partitions are discarded or detached immediately as required).

Moreover, embodiments add a new task for rolling window table maintenance called syspurge( ). The DBSCHEDULER executes on each of the existing databases a syspurge( ) task, which understands the policies using the information in the system catalogs and execute the appropriate actions described above.

Figure 12:
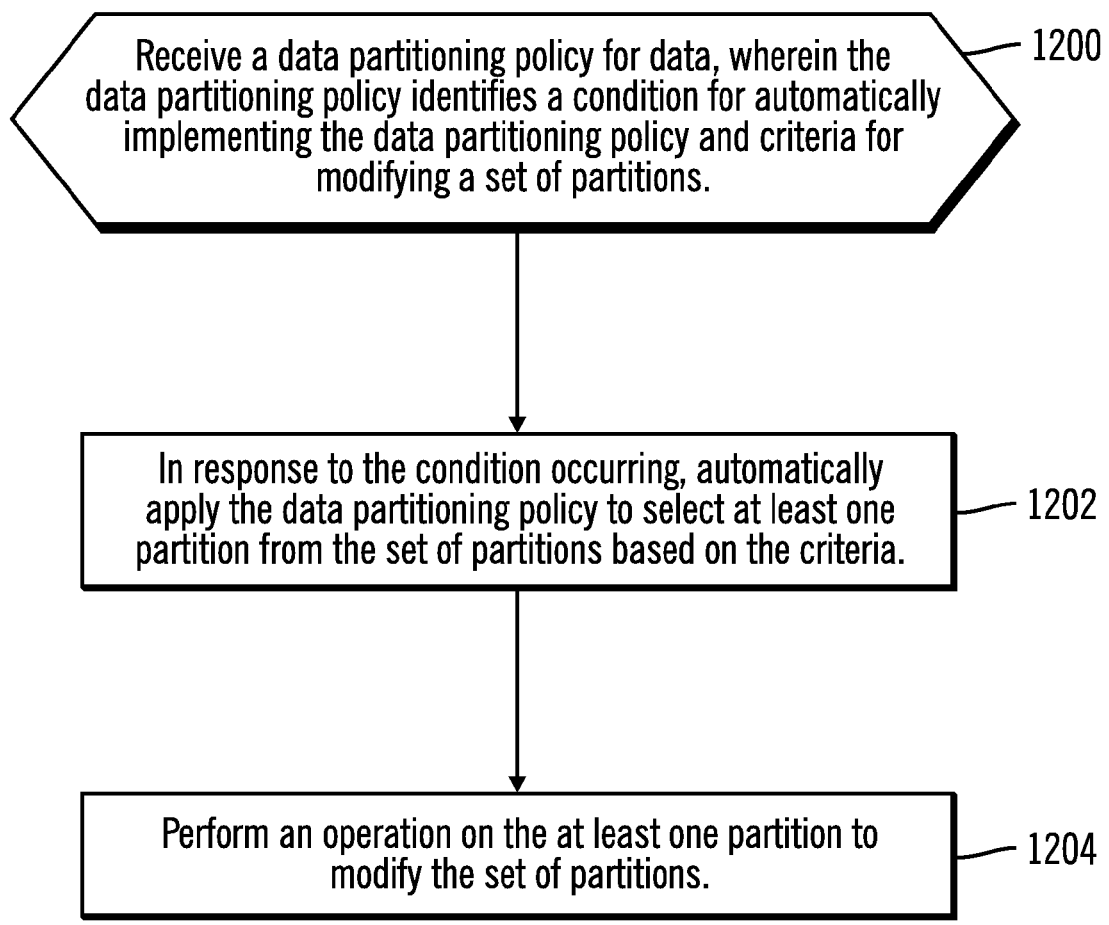
FIG. 12 illustrates a flow diagram for operations for a cyclic based data partitioning policy with automatic physical schema management in accordance with certain embodiments.

FIG. 12 illustrates a flow diagram for operations for a data partitioning policy with automatic physical schema management in accordance with certain embodiments. In certain embodiments, the data partitioning policy is a cyclic based data partitioning policy that is applied for cyclic data management (e.g., to add and remove partitions to a set of partitions based on a time cycle).

In FIG. 12, control begins at block 1200 with the PSMS 120 receiving a data partitioning policy (e.g., a cyclic based data partitioning policy) for data, wherein the data partitioning policy identifies a condition for automatically implementing the data partitioning policy and criteria for modifying a set of partitions. In block 1202, the PSMS 120, in response to the condition occurring, automatically applies the data partitioning policy to select at least one partition from the set of partitions based on the criteria. In block 1204, the PSMS 120 performs an operation on the at least one partition to modify the set of partitions.

In certain embodiments, the data partitioning policy modifies the set of partitions based on one or more of a ROLLING PARTITIONS strategy and a LIMIT TO strategy.

In certain embodiments, the data partitioning policy may be based on any sort of cyclic data. In certain embodiments, the condition is an elapsed amount of time or a numerical value specifying a portion of data to be retained. For example, assuming that there is a table containing events, which occur at specific time points, and the table is partitioned by month in which the event occurs, the data partitioning policy specifies that partitions outside of a specific set of months (for example, the last six months) should be discarded. Another example is for the same table to be partitioned by event identifier (where an event identifier is a sequential number). In this other example, each table partition would hold sets of (e.g., one million) event identifiers (first partitions has 1 to 1 million, second partition has from 1 million and 1 to 2 million, and so forth). In this example, the data partitioning policy specifies how many records to retain (e.g., the last 6 million records) by specifying a numerical value. Thus, embodiments allow retention policies to be specified over anything that can be split in discrete sets, which is time units or integer numbers.

In certain embodiments, the operation is at least one of creating the at least one partition, attaching the at least one partition to the set of partitions, detaching the at least one partition from the set of partitions, dropping the at least one partition from the set of partitions, discarding the at least one partition from the list of partitions, and modifying the at least one partition. In certain embodiments, attaching at least one partition to the set of partitions and detaching at least one partition from the set of partitions are performed online.

In certain embodiments, the data partitioning policy is defined using an INTERVAL PARTITION clause of a CREATE TABLE statement, and wherein the INTERVAL PARTITION clause includes one or more of a STORE IN clause, a ROLLING PARTITIONS clause, a LIMIT TO clause, a DETACH clause, and a DISCARD clause. In certain embodiments, the criteria is based on determining one of (1) that the number of interval partitions exceeds a specified quantity (i.e., specified in the ROLLING PARTITIONS clause) and (2) that a total storage allocated to a table storing the data exceeds a specified size (i.e., specified in the LIMIT TO clause).

For example, in certain embodiments, the PSMS 120 determines that a purge policy is to be enforced, selects a partition to be one of detached and discarded, and detaches or discards the selected partition.

Thus, embodiments helps customers encode the their time and space management policies and requirements on physical schema management in the Data Definition Language (DDL) and have the PSMS 120 of the RDBMS 110 implement these policies consistently. Thus, the policies are fully integrated within the RDBMS 110. Also, the policy is encoded within DDL so the definition may be migrated, tested, and copied over.

Embodiments enhance the use of time cyclic data management (partitioning) by avoiding additional scripting/education. For customers with existing time-cyclic data management setup, migrating to this eliminates the need for maintaining scripting code.

Embodiments implement the options ONLINE to enable 7×24 data availability and avoid application downtime or locking errors.

With embodiments, the policy is specified along with a schema definition in the system catalog 180. The additional information is stored in the system catalogs. That additional information and the ONLINE attach/detach/modify facilities are used to do the required operation via a built-in job scheduler.

Embodiments provide policy based management in a modern table partitioning strategy. Embodiments may be used in warehousing. Also, with embodiments, the policy may be based on time, size or temperature (e.g., "hot data" refers to frequently and highly accessed data and "cold data" refers to data that is rarely accessed). Embodiments cover various terms of data retention based on table size and/or any type of measure of any cyclic data. For example, embodiments cover retaining the last 6 months of data, any arbitrary set of six months of data, any specific number of records, or any specific number of unique values. With embodiments, the detaching of partitions is transparent to applications and tables (e.g., there is no need to explicitly or implicitly repartition the table).

Embodiments provide a technique for policy based automatic physical schema management that includes an ability to create new partitions automatically for the tables using an INTERVAL partition strategy, an ability to detach partitions online for interval or expression (range) strategy, an ability to attach partitions online for interval or expression (range) strategy, an in-built database job scheduler to recognize the policy requirements and execute them, an ability to automatically detect the need for statistics recollection after attach and detach operations and collect those in the background without intervention, a feature of specifying policy along with a schema definition, a feature of storing additional information in the system catalogs, and a feature of using information and the online create/attach/detach/modify facilities to do the required operation via the built-in job schedule.

Embodiments provide policy based automatic physical schema management that includes: providing an interface for specifying a cyclic based data partition (retention) policy for data and, responsive to receiving a request for the cyclic based partition (retention) policy for data by the interface, automatically applying the cyclic based data partition (retention) policy for the data. With embodiments, the cyclic based partition (retention) policy is selected from a group consisting of (elapsed) time and a (numerical) value indicating a criteria (condition) for performing an event. With embodiments, responsive to detecting the criteria specified by the interface, automatically performing the event to the data selected from a group consisting of add, drop, detach, discard, and otherwise modify (e.g., compress, repack, shrink, and other administrative actions) a partition. With embodiments, the data is for records in a database. With embodiments, the interface is selected from a group consisting of an Application Programming Interface (API), a configuration definition, a user interface language, a database access language, a Structured Query Language (SQL), etc. With embodiments, the parameters to the interface are selected from a group consisting of range, limit, rolling, interval, size, purge, etc.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
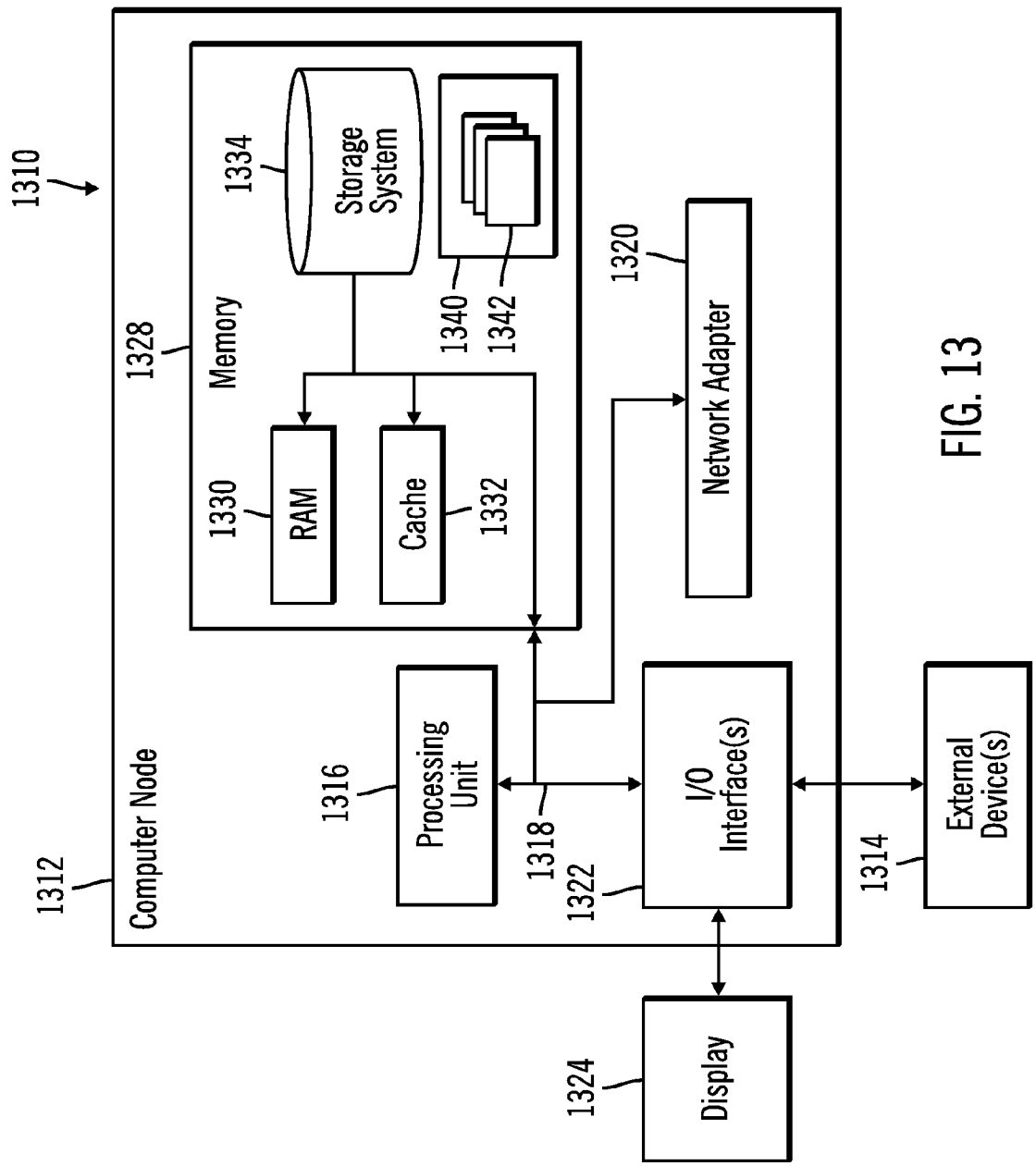
FIG. 13 depicts a cloud computing node in accordance with certain embodiments.

Referring now to FIG. 13, a schematic of an example of a cloud computing node is shown. Cloud computing node 1310 is only one example of a suitable cloud computing node and is not intended to suggest any limitation as to the scope of use or functionality of embodiments of the invention described herein. Regardless, cloud computing node 1310 is capable of being implemented and/or performing any of the functionality set forth hereinabove.

In cloud computing node 1310 there is a computer system/server 1312, which is operational with numerous other general purpose or special purpose computing system environments or configurations. Examples of well-known computing systems, environments, and/or configurations that may be suitable for use with computer system/server 1312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1312 in cloud computing node 1310 is shown in the form of a general-purpose computing device. The components of computer system/server 1312 may include, but are not limited to, one or more processors or processing units 1316, a system memory 1328, and a bus 1318 that couples various system components including system memory 1328 to processor 1316.

Bus 1318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1312 typically includes a variety of computer system readable media. Such media may be any available media that is accessible by computer system/server 1312, and it includes both volatile and non-volatile media, removable and non-removable media.

System memory 1328 can include computer system readable media in the form of volatile memory, such as random access memory (RAM) 1330 and/or cache memory 1332. Computer system/server 1312 may further include other removable/non-removable, volatile/non-volatile computer system storage media. By way of example only, storage system 1334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1318 by one or more data media interfaces. As will be further depicted and described below, memory 1328 may include at least one program product having a set (e.g., at least one) of program modules that are configured to carry out the functions of embodiments of the invention.

Program/utility 1340, having a set (at least one) of program modules 1342, may be stored in memory 1328 by way of example, and not limitation, as well as an operating system, one or more application programs, other program modules, and program data. Each of the operating system, one or more application programs, other program modules, and program data or some combination thereof, may include an implementation of a networking environment. Program modules 1342 generally carry out the functions and/or methodologies of embodiments of the invention as described herein.

Computer system/server 1312 may also communicate with one or more external devices 1314 such as a keyboard, a pointing device, a display 1324, etc.; one or more devices that enable a user to interact with computer system/server 1312; and/or any devices (e.g., network card, modem, etc.) that enable computer system/server 1312 to communicate with one or more other computing devices. Such communication can occur via Input/Output (I/O) interfaces 1322. Still yet, computer system/server 1312 can communicate with one or more networks such as a local area network (LAN), a general wide area network (WAN), and/or a public network (e.g., the Internet) via network adapter 1320. As depicted, network adapter 1320 communicates with the other components of computer system/server 1312 via bus 1318. It should be understood that although not shown, other hardware and/or software components could be used in conjunction with computer system/server 1312. Examples, include, but are not limited to: microcode, device drivers, redundant processing units, external disk drive arrays, RAID systems, tape drives, and data archival storage systems, etc.

Figure 14:
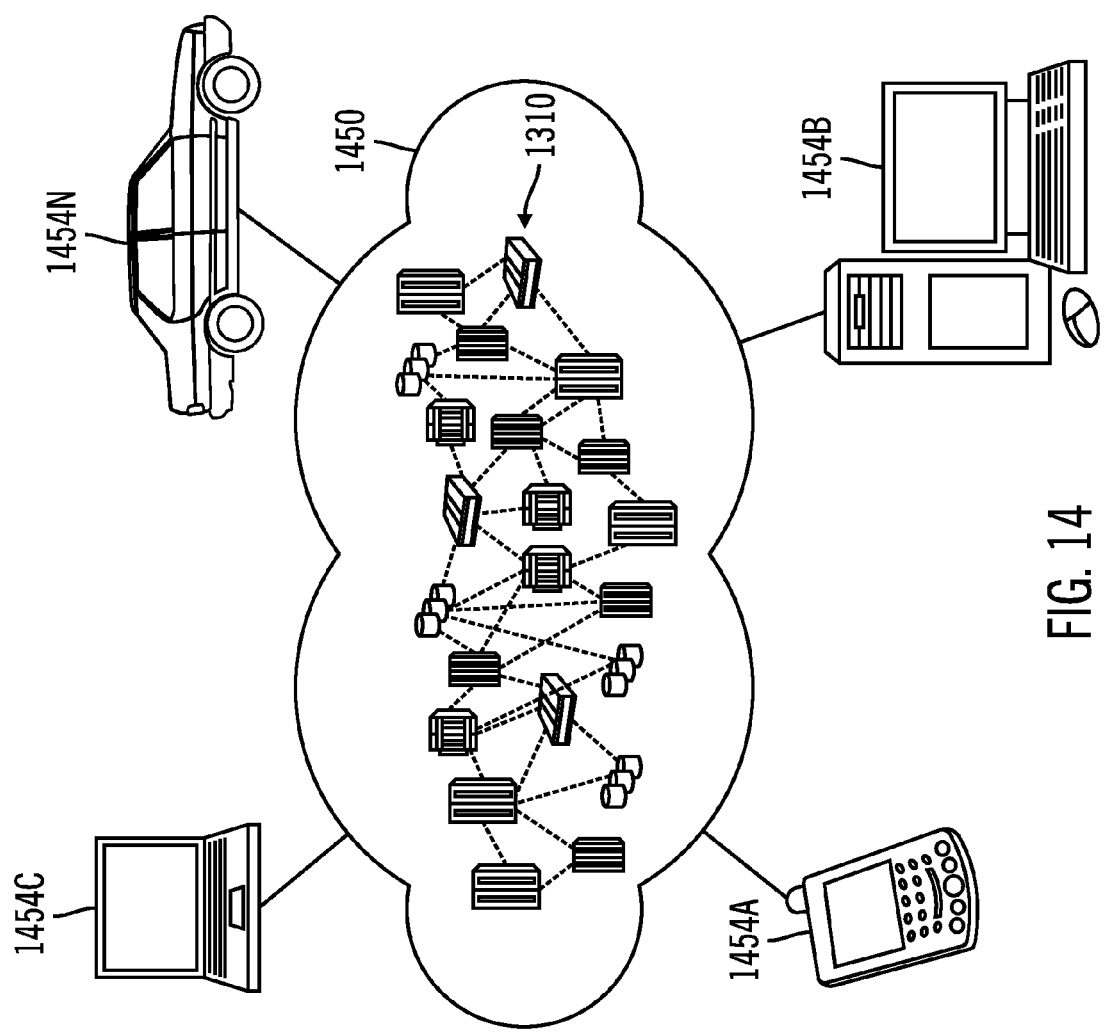
FIG. 14 depicts a cloud computing environment in accordance with certain embodiments.

Referring now to FIG. 14, illustrative cloud computing environment 1450 is depicted. As shown, cloud computing environment 1450 comprises one or more cloud computing nodes 1310 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1310 and cloud computing environment 1450 can communicate with any type of computerized device over any type of network and/or network addressable connection (e.g., using a web browser).

Figure 15:
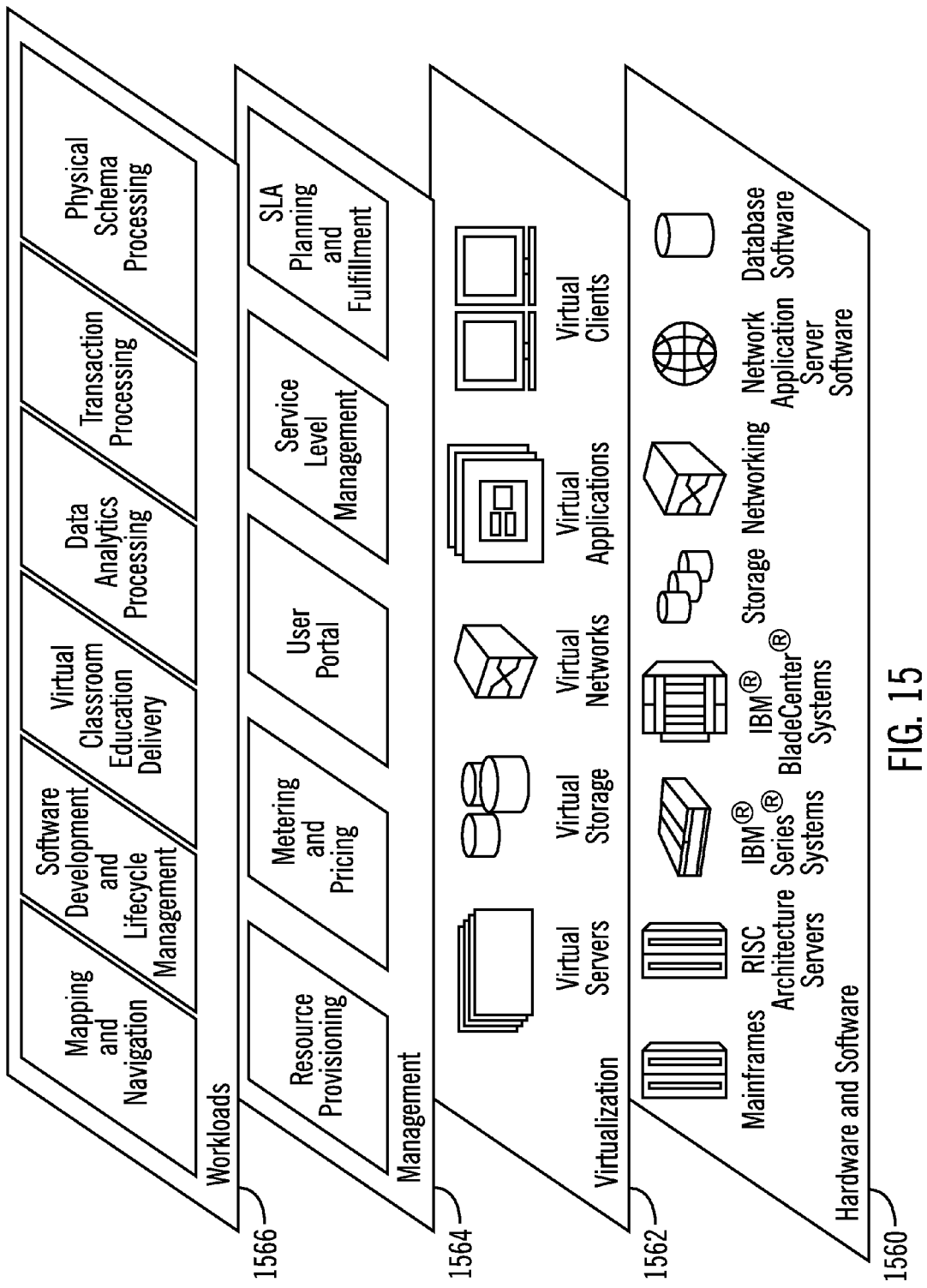
FIG. 15 depicts abstraction model layers in accordance with certain embodiments.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 1562 provides an abstraction layer from which the following examples of virtual entities may be provided: virtual servers; virtual storage; virtual networks, including virtual private networks; virtual applications and operating systems; and virtual clients.

In one example, management layer 1564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and physical schema management.

Thus, in certain embodiments, software or a program, implementing physical schema management in accordance with embodiments described herein, is provided as a service in a cloud environment.

In certain embodiments, the server computer 100 has the architecture of computing node 1310. In certain embodiments, the server computer 100 is part of a cloud environment. In certain alternative embodiments, the server computer 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

We claim:

1. A computer program product, the computer program product comprising a non-transitory computer readable storage medium having program code embodied therewith, the program code executable by at least one processor to perform:

receiving a data partitioning policy for data in a set of partitions for a table, wherein the data partitioning policy identifies a condition for automatically implementing the data partitioning policy, wherein the data partitioning policy is described in a statement that includes a rolling partitions clause that specifies a quantity of partitions to keep for the table and a limit to clause that indicates a maximum size of the table;

in response to the condition occurring, determining one of that a number of the partitions in the set of partitions for the table exceeds the specified quantity and that a total storage allocated to the table exceeds the maximum size; and performing an operation on at least one partition to modify the set of partitions, wherein, when the operation is for detachment, for the rolling partitions clause, performing the operation for detachment until the specified quantity of the partitions to keep for the table is met by selecting the at least one partition that holds a lowest set of values; and for the limit to clause, performing the operation for detachment until the maximum size is met by selecting one of an interval partition and a range partition based on:

in response to an ANY clause being specified with the limit to clause, selecting one of the interval partition and the range partition holding the lowest set of values;

in response to an INTERVAL ONLY clause being specified in the limit to clause, selecting the interval partition; and in response to an INTERVAL FIRST clause being specified with the limit to clause, selecting the interval partition before selecting the range partition.

2. The computer program product of claim 1, wherein the operation is at least one of creating the at least one partition, attaching the at least one partition to the set of partitions, dropping the at least one partition from the set of partitions, discarding the at least one partition from the set of partitions, and modifying the at least one partition.

3. The computer program product of claim 2, wherein the program code is executable by the at least one processor to perform:

in response to one of attaching the at least one partition to the set of partitions and detaching the at least one partition from the set of partitions, collecting statistics for data remaining in the table.

4. The computer program product of claim 3, wherein attaching the at least one partition to the set of partitions and detaching the at least one partition from the set of partitions are performed while at least one other user is accessing the table.

5. The computer program product of claim 1, wherein the program code is executable at least in part by a Software as a Service (SaaS) offering.

6. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations, wherein the operations comprise:
receiving a data partitioning policy for data in a set of partitions for a table, wherein the data partitioning policy identifies a condition for automatically implementing the data partitioning policy, wherein the data partitioning policy is described in a statement that includes a rolling partitions clause that specifies a quantity of partitions to keep for the table and a limit to clause that indicates a maximum size of the table;
in response to the condition occurring, determining one of that a number of the partitions in the set of partitions for the table exceeds the specified quantity and that a total storage allocated to the table exceeds the maximum size; and
performing an operation on at least one partition to modify the set of partitions, wherein, when the operation is for detachment,
for the rolling partitions clause, performing the operation for detachment until the specified quantity of the partitions to keep for the table is met by selecting the at least one partition that holds a lowest set of values; and
for the limit to clause, performing the operation for detachment until the maximum size is met by selecting one of an interval partition and a range partition based on:
in response to an ANY clause being specified with the limit to clause, selecting one of the interval partition and the range partition holding the lowest set of values;
in response to an INTERVAL ONLY clause being specified in the limit to clause, selecting the interval partition; and
in response to an INTERVAL FIRST clause being specified with the limit to clause, selecting the interval partition before selecting the range partition.

7. The computer system of claim 6, wherein the operation is at least one of creating the at least one partition, attaching the at least one partition to the set of partitions, dropping the at least one partition from the set of partitions, discarding the at least one partition from the set of partitions, and modifying the at least one partition.

8. The computer system of claim 7, wherein the operations further comprise:
in response to one of attaching the at least one partition to the set of partitions and detaching the at least one partition from the set of partitions, collecting statistics for data remaining in the table.

9. The computer system of claim 8, wherein attaching the at least one partition to the set of partitions and detaching the at least one partition from the set of partitions are performed while at least one other user is accessing the table.

10. The computer system of claim 6, wherein the program instructions are executable at least in part by a Software as a Service (SaaS) offering.

11. The computer system of claim 6, wherein the data partitioning policy is defined by specifying at least one of: whether any detached partitions are to be one of dropped and preserved and where new partitions are to be stored.

12. The computer system of claim 6, wherein the condition is one of an elapsed amount of time and a numerical value specifying a portion of data to be retained.

13. The computer program product of claim 1, wherein the data partitioning policy is defined by specifying at least one of: whether any detached partitions are to be one of dropped and preserved and where new partitions are to be stored.

14. The computer program product of claim 1, wherein the condition is one of an elapsed amount of time and a numerical value specifying a portion of data to be retained.

* * * * *